United States Patent
Shimazaki

(10) Patent No.: US 6,896,235 B2
(45) Date of Patent: May 24, 2005

(54) MOLD FOR MOLDING FOAMED TUBE FOR TIRE, AND METHOD OF MANUFACTURING FOAMED TUBE FOR TIRE

(75) Inventor: Nobuyoshi Shimazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 436 days.

(21) Appl. No.: 10/146,063

(22) Filed: May 16, 2002

(65) Prior Publication Data

US 2002/0179226 A1 Dec. 5, 2002

(30) Foreign Application Priority Data

Jun. 1, 2001 (JP) ........................................ 2001-167282

(51) Int. Cl.[7] .............................................. B29C 35/00
(52) U.S. Cl. ........................................ 249/160; 425/49
(58) Field of Search ................... 249/160, 56; 425/49, 425/28.1

(56) References Cited

U.S. PATENT DOCUMENTS

| | | | | |
|---|---|---|---|---|
| 1,604,452 A | * | 10/1926 | Krusemark | 425/37 |
| 3,057,011 A | * | 10/1962 | Knox | 425/46 |
| 3,505,447 A | * | 4/1970 | Billes | 264/293 |
| 3,948,304 A | * | 4/1976 | Mirtain | 152/511 |
| 4,063,861 A | * | 12/1977 | Schmidt et al. | 425/542 |
| 4,181,488 A | * | 1/1980 | Grawey et al. | 425/577 |
| 4,367,109 A | | 1/1983 | Estrade et al. | |
| 4,909,972 A | * | 3/1990 | Britz | 264/51 |
| 5,059,380 A | * | 10/1991 | Wise et al. | 264/326 |
| 5,614,225 A | | 3/1997 | Volpi et al. | |
| 5,676,980 A | * | 10/1997 | Gulka et al. | 425/40 |
| 6,789,591 B2 | * | 9/2004 | Ikeda | 152/523 |

FOREIGN PATENT DOCUMENTS

| | | |
|---|---|---|
| EP | 0 594 072 A1 | 10/1993 |
| JP | 10 329228 | 12/1998 |

* cited by examiner

Primary Examiner—Allan R. Kuhns
(74) Attorney, Agent, or Firm—Oliff Berridge, PLC

(57) ABSTRACT

A mold for molding a foamed tube for a tire is formed from a first mold and a second mold. Each mold has an annular concave portion for tube molding, and joining faces which are continuous with the annular concave portion and are formed at an inner side and an outer side, in a radial direction, of the annular concave portion. Each of the joining faces of the first mold and the joining faces of the second mold has horizontal joining faces provided adjacent to the annular concave portion in a direction orthogonal to an axial direction at a radially inner side and a radially outer side of the annular concave portion, and an inclined joining face provided continuously with the horizontal joining face so as to be inclined with respect to the horizontal joining face at one of an inner side and an outer side in the radial direction.

14 Claims, 11 Drawing Sheets

RELATED ART

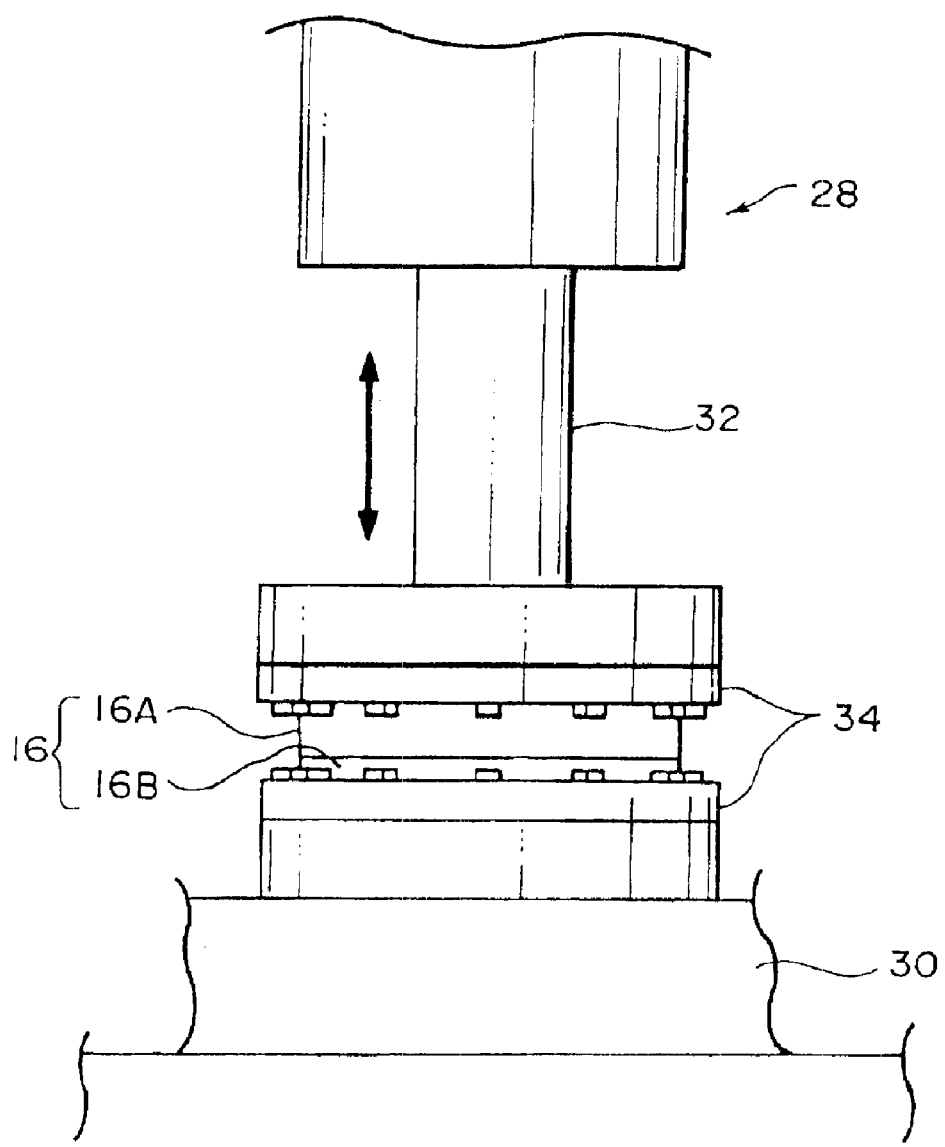

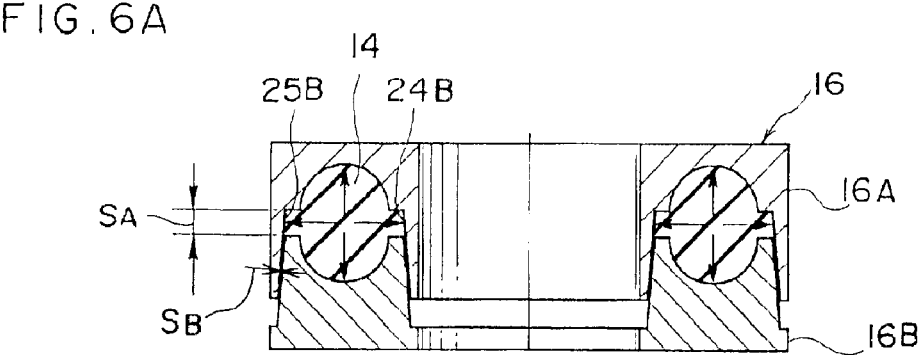
FIG.6A
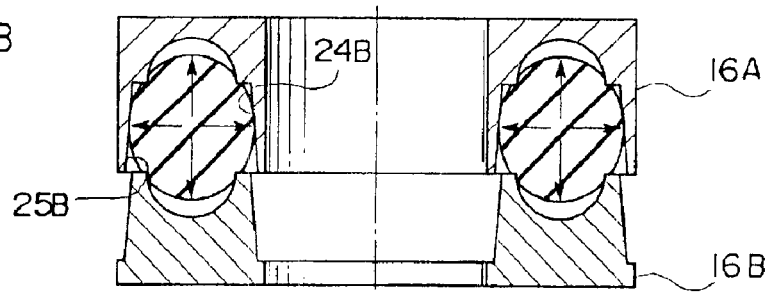
FIG.6B
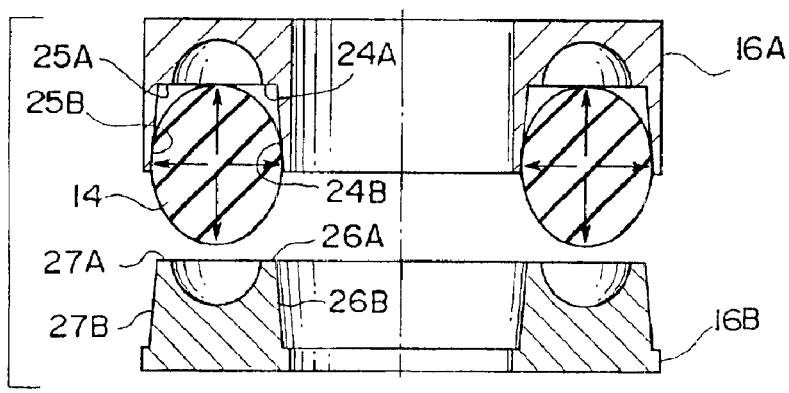
FIG.6C
FIG.6D
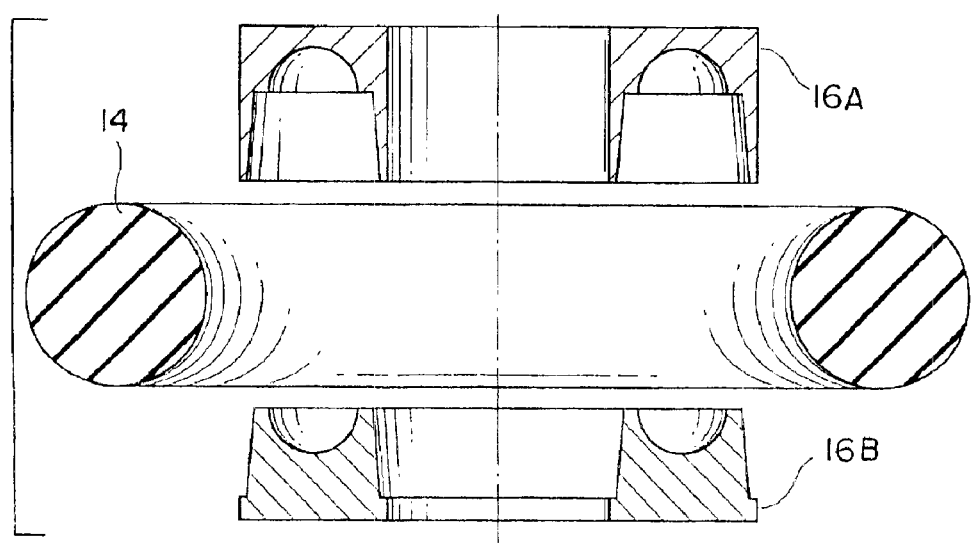

RELATED ART

RELATED ART

MOLD FOR MOLDING FOAMED TUBE FOR TIRE, AND METHOD OF MANUFACTURING FOAMED TUBE FOR TIRE

BACKGROUND OF THE INVENTION

1. Field of the Invention

The present invention relates to a mold for molding a foamed tube for a tire which is used in place of a hollow rubber tube of a pneumatic tire, and to a method of manufacturing a foamed tube for a tire.

2. Description of the Related Art

For example, in order to prevent bursting of tires mounted to motorcycles for motocross, there are cases in which a donut-shaped toroidal sponge, which is formed from an elastic body of rubber or the like, is filled in the tire in place of an air tube.

Conventionally, such a toroidal sponge is manufactured as follows.

(1) First, a rubber composition containing foaming agents, foaming auxiliaries and the like, is extruded at an extruder so as to form a solid cylindrical rubber material. Both ends thereof are joined together and a donut-shaped torus 14 such as shown in FIG. 2 is molded.

(2) Next, by using a mold 102 formed from an upper die 102A and a lower die 102B such as shown in FIG. 12A, the donut-shaped torus 14 is filled into the mold 102 as shown in FIG. 12A. After the upper die 102A and the lower die 102B are fixed by an unillustrated fastening hardware, the mold 102 is sandwiched between heating plates and vulcanization is carried out.

In the conventional mold 102, a joining face 103A of the upper die 102A and a joining face 103B of the lower die 102B are both horizontal.

After vulcanization, when the mold 102 is removed from the heating plates and the fastening hardware is undone, the donut-shaped torus 14 expands, and a sponge-like foamed tube for a tire is obtained.

The foamed tube for a tire which is obtained in this way is cooled naturally at room temperature, and is kept until the foaming rate decreases and is stable. A foamed tube for a tire whose dimensions have stabilized is then served for use (i.e., actually mounted to a motorcycle or the like).

However, after vulcanization, when the mold is opened (i.e., when the mold is opened to the atmosphere), the gas generated in the rubber becomes air bubbles and expands. The rubber composition suddenly expands (the volume thereof suddenly increases to about 500 to 1200%) substantially simultaneously with the opening of the mold 102. The swelled rubber composition enters into the narrow gap between the joining faces of the upper die 102A and the lower die 102B which are opened slightly, and bursts out to the exterior of the mold 102.

At this point in time, the expanding of the rubber composition is local, and the elongation of the outer surface at this swelled portion is extremely high. Thus, as shown in FIG. 13, tears 104, 106 arise in the surface of the rubber composition which has burst out and swelled. As shown in FIG. 14, a problem arises in that there are many cases in which the tears 104, 106 remain in the foamed tube for a tire (the donut-shaped torus 14) which is finally obtained. Thus, conventionally, the speed of opening the vulcanizing press to which the mold 102 is mounted is made to be extremely fast in order to handle the expanding of the rubber composition, or the joining face 103A and the joining face 103B of the upper die 102A and the lower die 102B are made to be extremely wide so as to suppress the bursting out of the rubber composition to the exterior of the mold, or the foaming rate is set to be low to the extent that tears do not arise, or the blending composition of the rubber composition is adjusted so as to make the modulus high.

However, making the opening speed of the mold 102 be as fast as the speed at which the rubber composition expands results in the vulcanizing press becoming a large-sized equipment. The cost thereof then increases drastically, and a large space is required for the placement thereof.

On the other hand, making the horizontal mating surfaces of the mold 102 wide leads to the outer dimensions of the vulcanization mold becoming greater. The cost of the mold 102 then inevitably increases, the handling thereof is difficult and workability is poor.

Further, in order to address the above problem by adjusting the blending composition of the rubber composition, the properties of the rubber composition have to be restricted, and there are cases in which desired product properties cannot be obtained.

SUMMARY OF THE INVENTION

In view of the aforementioned, an object of the present invention is to provide a mold for molding a foamed tube for a tire and a method of manufacturing a foamed tube for a tire which can overcome the above-described problems of the conventional art.

In order to achieve the above object, a first aspect of the present invention is a mold for molding an annular foamed tube for a tire, comprising: a first mold having a first annular concave portion which molds one side, in an axial direction, of the foamed tube for a tire; and a second mold having a second annular concave portion which molds another side, in the axial direction, of the foamed tube for a tire, wherein when the first mold and the second mold are combined in the axial direction, the first annular concave portion and the second annular concave portion form an annular space for molding the foamed tube for a tire, the first mold has first joining faces which are connected to the first annular concave portion and which are positioned at an inner side and an outer side, in a radial direction, of the first annular concave portion, and the first joining faces include horizontal joining faces provided adjacent to the first annular concave portion in a direction orthogonal to the axial direction at the inner side and the outer side, in the radial direction, of the first annular concave portion, and inclined joining faces each provided continuously with a respective one of the horizontal joining faces so as to be inclined with respect to the horizontal joining face at one of an inner side and an outer side in the radial direction, the second mold has second joining faces which are connected to the second annular concave portion and which are positioned at an inner side and an outer side, in the radial direction, of the second annular concave portion, and the second joining faces include horizontal joining faces provided adjacent to the second annular concave portion in a direction orthogonal to the axial direction at the inner side and the outer side, in the radial direction, of the second annular concave portion, and inclined joining faces each provided continuously with a respective one of the horizontal joining faces so as to be inclined with respect to the horizontal joining face at one of an inner side and an outer side in the radial direction, and the first mold and the second mold have configurations which complementarily complete one another via the first joining faces and the second joining faces.

Operation of the mold for molding a foamed tube for a tire based on the above-described first aspect will now be explained.

First, the foaming-agent-containing rubber composition, which is formed in a toroidal configuration, is positioned in the first annular concave portion (or the second annular concave portion) of the mold which has been preheated, and the first mold and the second mold are closed.

Thereafter, the molds are heated by a heater, and vulcanization of the rubber composition is carried out.

In this way, gas is generated by the foaming agent, innumerable, independent air bubbles form in the rubber composition, and the internal pressure of the rubber composition rises.

After heating has been carried out for a predetermined period of time, the molds are opened, and the rubber composition is removed.

When the molds are opened, the air bubbles expand, and the rubber composition swells and becomes a foamed rubber.

In the molds, each of the joining faces of the first mold and the joining faces of the second mold has horizontal joining faces provided adjacent to the annular concave portion in a direction orthogonal to an axial direction at an inner side and an outer side, in the radial direction, of the annular concave portion, and an inclined joining face provided continuously with each horizontal joining face so as to be inclined with respect to the horizontal joining face at one of an inner side and an outer side in the radial direction. Accordingly, in the initial stages of opening the two molds which have been combined, the gap between the inclined joining faces of the first mold and the inclined joining faces of the second mold remains extremely small as compared with the dimension by which the first mold and the second mold are separated.

When the molds are opened immediately after vulcanization molding of the rubber composition has been completed, substantially simultaneously, the rubber composition swells rapidly, and first, the rubber composition enters into a gap between the horizontal joining faces of the first mold and the horizontal joining faces of the second mold. The foamed rubber composition which has entered into the gap between the horizontal joining face portions abuts the inclined joining faces at the outer sides and stops.

Immediately after the molds are opened, as mentioned above, the gap between the inclined joining face portions remains extremely narrow. Further, the direction of the gap between these inclined joining face portions is much different than the direction of swelling of the rubber composition which has entered into the gap between the horizontal joining face portions. Moreover, as the mold is opened, even if the gap between the horizontal joining faces becomes large, the size of the swelling rubber composition at the gap between the horizontal joining face portions simultaneously becomes large. Accordingly, the force of the swelling rubber composition entering into the gap between the inclined joining faces is small.

Then, until the molds are completely opened, the swelled, foamed rubber composition is pushed by its own swelling force against the inclined joining faces, and sliding resistance is generated. Thus, the foamed rubber composition does not move within the molds. Namely, until the molds are completely opened, the swelled, foamed rubber composition does not protrude out to the exterior of the molds from the gap between the inclined joining faces.

In this way, because sudden swelling of the distal end portion of the rubber composition, i.e., elongation of the surface thereof, can be suppressed, tears do not form in the surface of the swelled rubber composition.

The molds are then completely opened, and the foamed, toroidal rubber composition is removed therefrom and left at room temperature until the foaming rate is stabilized. The production of the foamed tube for a tire is thereby completed.

In a second aspect of the present invention, of the inclined joining faces of the first joining faces and the inclined joining faces of the second joining faces, at least the inclined joining faces which are positioned at the outer side in the radial direction form an angle of 90 to 120° with respect to the horizontal joining face adjacent thereto.

Next, operation of the mold for molding a foamed tube for a tire based on the above-described second aspect will be explained.

If the angle of the inclined joining face positioned at the outer side in the radial direction, with respect to the horizontal joining face adjacent thereto, is 120° or more, the outer shape of the mold becomes too large, which is not effective.

On the other hand, if the angle of the inclined joining face with respect to the horizontal inclined surface is less than 90°, it is not possible to open and close the first mold and the second mold unless at least one of the first mold and the second mold is divided into plural pieces.

If the angle between the inclined joining face and the horizontal joining face of the first mold and the angle between the inclined joining face and the horizontal joining face of the second mold are different, opening and closing of the first mold and the second mold are possible. However, even if such a structure is employed, if the inclined joining face positioned at the outer side in the radial direction is 90° or less with respect to the horizontal joining face, the foamed rubber composition catches on the mold and removal thereof will be difficult.

Note that the angle of the inclined joining face positioned at the outer side in the radial direction, with respect to the horizontal joining face adjacent thereto, is preferably 93 to 105°.

In the third aspect of the present invention, a cross-sectional configuration, along the axial direction, of the annular space is circular, and given that a radius of the annular space is R and a projected length, in the axial direction, of the inclined joining face is H, a relation $R \leq H \leq 3R$ is satisfied.

Next, operation of the mold for molding a foamed tube for a tire based on the above-described third aspect will be explained.

If R>H, there is the concern that, when the foaming rate is 6 times or more, cracks will form in the foamed rubber composition.

If H>3R, no further improvement in the effect of preventing generation of cracks in the foamed rubber composition is discerned (the effects have already topped out), and the mold becomes large-sized.

Note that it is even more preferable that the relation $2.0R \leq H \leq 2.5R$ is satisfied.

Further, if the cross-sectional configuration of the annular space is a configuration other than circular (e.g., is oval), it is preferable to determine the radius of a circle set to have the same cross-sectional area, and to determine the dimensions of the respective portions such that the relationship between the determined radius and the length H satisfies the above stipulation.

A fourth aspect of the present invention is a method of manufacturing a foamed tube for a tire, comprising the steps of: (a) filling a foaming-agent-containing rubber composition, which generates gas when heated, into at least the annular space of the mold recited in claim 1; and (b) heating and vulcanizing the foaming-agent-containing rubber composition.

The method of manufacturing a foamed tube for a tire based on the above-described fourth aspect has the same contents as the operation of the first aspect, and therefore, description thereof will be omitted.

BRIEF DESCRIPTION OF THE DRAWINGS

FIG. 5 is a front view of main portions of a press machine to which the mold is mounted.

FIGS. 6A through 6D are explanatory diagrams showing processes of opening the mold.

DESCRIPTION OF THE PREFERRED EMBODIMENTS

An embodiment of the present invention will be described with reference to the drawings.

In the present embodiment, explanation will be given of a method of manufacturing a foamed tube for a tire which is used in a pneumatic tire of a motorcycle.

First, a rubber composition containing a foaming agent is extruded from the die of an extruder, which die has a circular opening, so as to obtain an elongated extruded rubber composition whose cross-sectional configuration orthogonal to the longitudinal direction thereof is circular. By using the extruder, it is possible to continuously obtain a homogeneous elongated extruded rubber composition whose cross-sectional configuration is constant and whose dimensions are constant.

The rubber composition containing a foaming agent is formed of, for example, 100 parts by weight of butyl rubber, 20 to 50 parts by weight of a filler, 0 to 20 parts by weight of process oil, 1 to 5 parts by weight of a vulcanizing agent, 1 to 3 parts by weight of a vulcanization accelerator, 4 to 15 parts by weight of a foaming agent, 0 to 8 parts by weight of a foaming auxiliary, and the like.

Dinitrosopentamethylenetetraamine (DPT), azodicarbonamide (ADCA), dinitrosopentastyrenetetramine or benzenesulfonyl hydrazide derivatives, oxybisbenzenesulfonyl hydrazide (OBSH) or the like can be used as the foaming agent.

An auxiliary agent which is generally used in the manufacture of a foamed product, such as urea, zinc stearate, zinc benzene sulfinate, zinc white or the like, is preferably used as the foaming auxiliary.

Substances other than those listed above may be used as the foaming agent and the foaming auxiliary.

Next, an elongated extruded rubber composition 10, which has been extruded, is cut into a predetermined length by a cutter or the like.

Figure 1A:
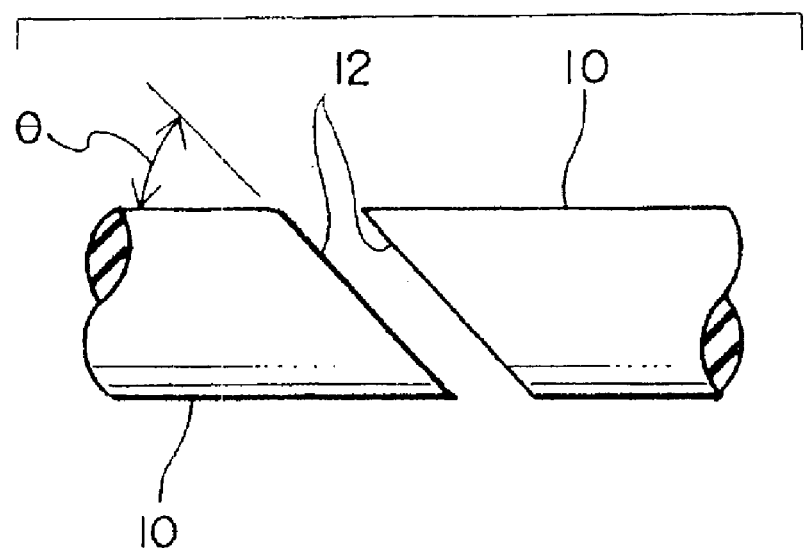
FIG. 1A is a side view showing a vicinity of a cut surface of an elongated extruded rubber composition used in the device and method of the present invention.

As shown in FIG. 1A, it is preferable that a cut surface 12 of the elongated extruded rubber composition 10 is formed at an incline, rather than at a right angle, with respect to the longitudinal direction. An angle θ of the cut surface 12 shown in FIG. 1A is preferably about 30°. In this way, the surface area of the cut surface, i.e., the surface area of joining, can be made large.

Figure 1B:
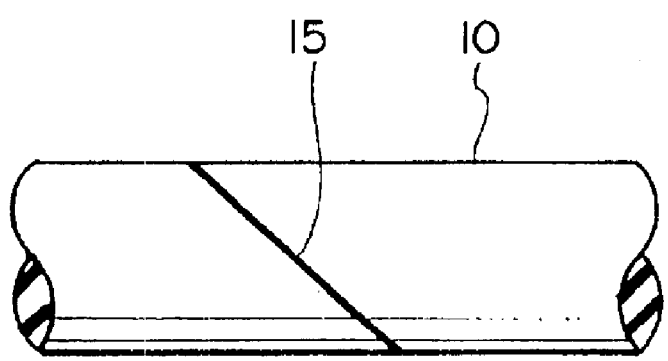
FIG. 1B is a side view showing a joined portion of the elongated extruded rubber composition of FIG. 1A.
Figure 2:
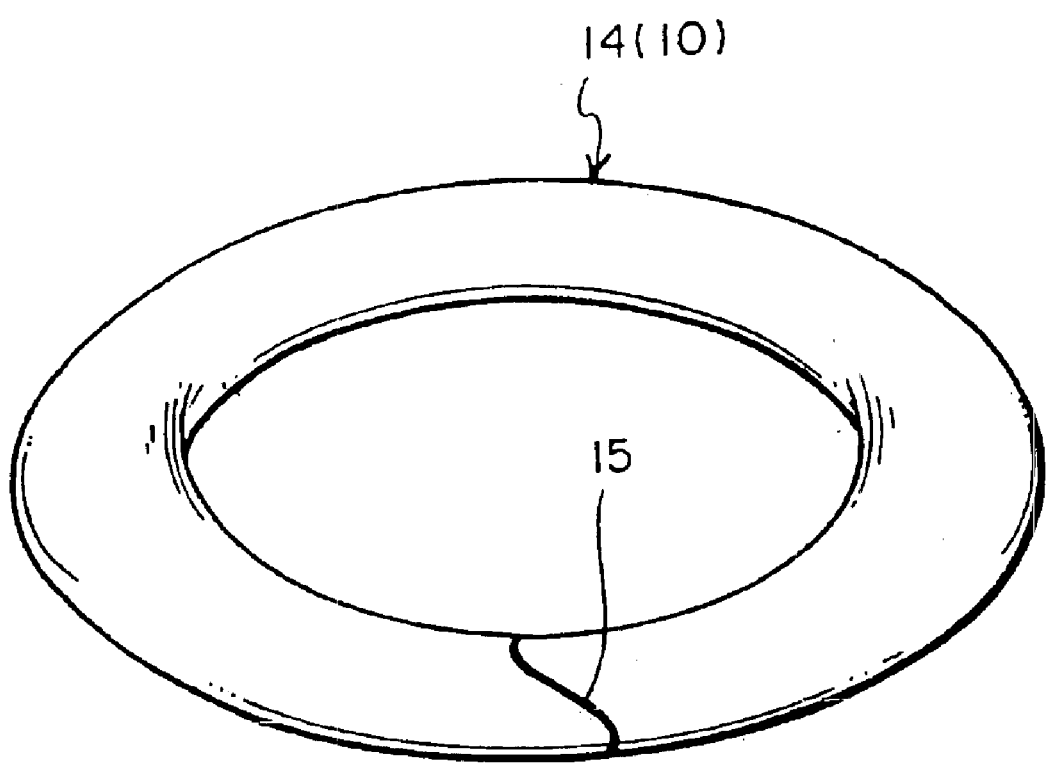
FIG. 2 is a perspective view of a donut-shaped torus in which the elongated extruded rubber composition is joined.

Next, as shown in FIG. 1B, the cut surfaces 12 of both ends are joined together, such that the elongated extruded rubber composition 10 becomes a donut-shaped torus 14 as shown in FIG. 2.

Because the slantly cut surfaces 12, which are clean, newly cut and uniform without curling wrinkles or curling stripes, are joined together, the strength of a joint portion 15 can be increased to near that of the other portions (the non-joint portions). Entry of air and separation at the joint after vulcanization can be prevented.

The donut-shaped torus 14 formed in this way is vulcanized in a mold 16 which will be described hereinafter.

(Manufacture of Mold)

Figure 3A:
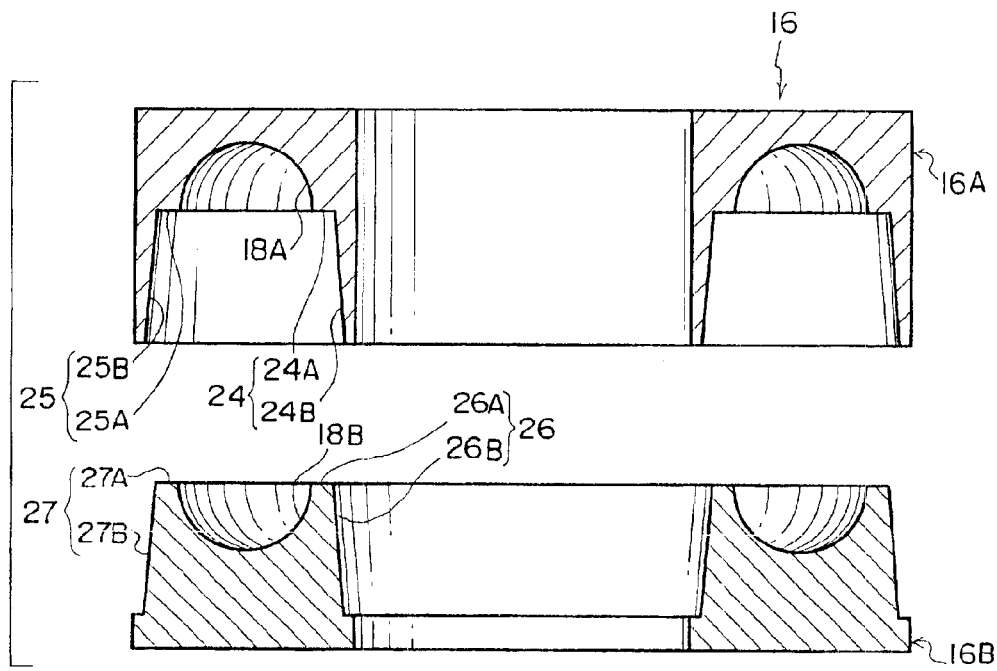
FIG. 3A is a cross-sectional view of a mold of the present invention in an open state.

As shown in FIG. 3A, the mold 16 is formed from an upper die 16A serving as a first mold and a lower die 16B serving as a second mold, which can be opened and closed in the vertical direction. An annular concave portion 18A, whose cross-section is semicircular, is formed in the upper die 16A, and an annular concave portion 18B, whose cross-section is semicircular, is formed in the lower die 16B such that, when the upper die 16A and the lower die 16B are closed, a donut-shaped, toroidal space 18, which serves as an annular space whose cross-sectional configuration is circular, is formed in the interior (refer to FIGS. 3B and 4; a diameter DA of a central portion is 980 mm, and a radius R is 40 mm).

As shown in FIG. 3A, in the upper die 16A, an inner side mating face 24 is formed at the inner side, in the radial direction, of the annular concave portion 18A, and an outer side mating face 25 is formed at the outer side in the radial direction.

The inner side mating face 24 has a horizontal joining face 24A, and an inclined joining face 24B which is connected to the inner end, in the radial direction, of the horizontal joining face 24A.

Figure 4:
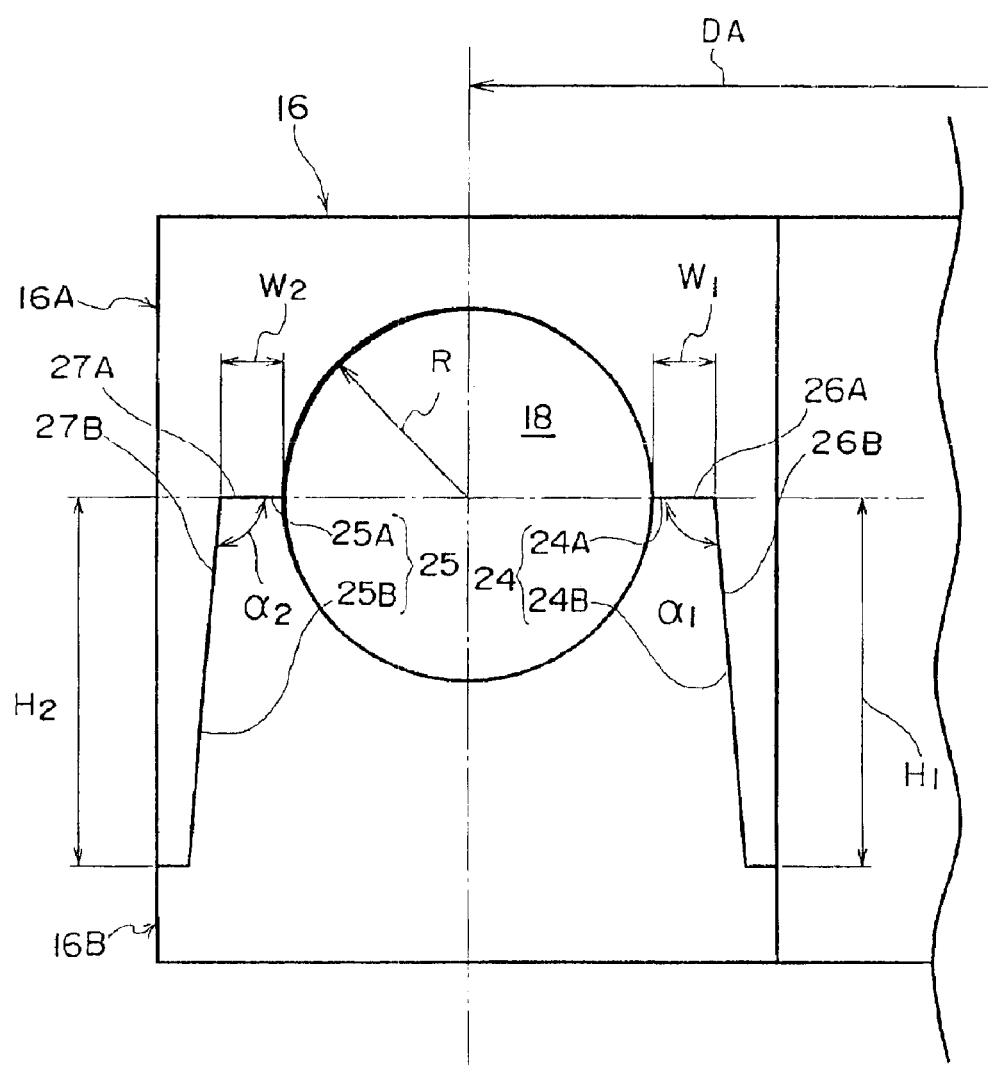
FIG. 4 is a partial, enlarged cross-sectional view of the mold which is closed.

As shown in FIG. 4, an angle $\alpha_1$ of the inclined joining face 24B with respect to the horizontal joining face 24A is preferably in a range of 90° to 120°, and is more preferably in a range of 93° to 105°. In the present embodiment, the angle $\alpha_1$ is set to be 95°.

A vertical direction dimension $H_1$ of the inclined joining face 24B is preferably in a range of 1 to 3 times a radius R of the space 18, and is more preferably in a range of 2.0 to 2.5 times. In the present embodiment, the dimension $H_1$ is set to be 1.25 times the radius R.

Further, a width $W_1$, in the radial direction, of the horizontal joining face 24A is preferably in a range of 5 to 30 mm. In the present embodiment, the width $W_1$ is set to be 15 mm.

On the other hand, as shown in FIG. 3A, the outer side mating face 25 has a horizontal joining face 25A, and an inclined joining face 25B which is connected to the outer side end, in the radial direction, of the horizontal joining face 25A.

As shown in FIG. 4, an angle $\alpha_2$ of the inclined joining face 25B with respect to the horizontal joining face 25A is preferably in a range of 90° to 120°, and is more preferably in a range of 93° to 105°. In the present embodiment, the angle $\alpha_2$ is set to be 95°.

A vertical direction dimension $H_2$ of the inclined joining face 25B is preferably in a range of 1 to 3 times the radius R of the space 18, and is more preferably in a range of 2.0 to 2.5 times. In the present embodiment, the dimension $H_2$ is set to be 1.25 times the radius R.

Further, a width $W_2$, in the radial direction, of the horizontal joining face 25A is preferably in a range of 5 to 30 mm. In the present embodiment, the width $W_2$ is set to be 15 mm.

As shown in FIG. 3A, in the lower die 16B, an inner side joining face 26 is formed at the inner side, in the radial direction, of the annular concave portion 18B, and an outer side joining face 27 is formed at the outer side in the radial direction.

The inner side joining face 26 has a horizontal joining face 26A, and an inclined joining face 26B which is connected to the inner end, in the radial direction, of the horizontal joining face 26A.

Figure 3B:
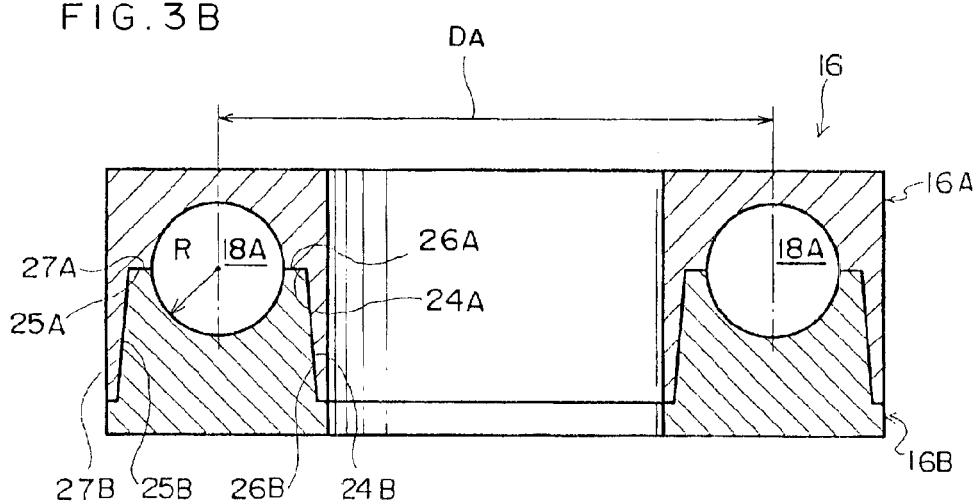
FIG. 3B is a cross-sectional view of the mold of the present invention in a closed state.

In the present embodiment, as shown in FIGS. 3B and 4, when the upper die 16A and the lower die 16B are closed, the horizontal joining face 26A of the lower die 16B fits tightly to the horizontal joining face 24A of the upper die 16A, the inclined joining face 26B of the lower die 16B fits tightly to the inclined joining face 24B of the upper die 16A, the horizontal joining face 27A of the lower die 16B fits tightly to the horizontal joining face 25A of the upper die 16A, and the inclined joining face 27B of the lower die 16B fits tightly to the inclined joining face 25B of the upper die 16A.

Next, a press machine 28 to which the mold 16 is mounted will be described in accordance with FIG. 5. Note that, although usually a thrust-up mold is used in which a piston rod is disposed at the lower side of the mold 16, here, explanation will be given of a push-down mold.

Heating plates 34, which have in the interiors thereof heat sources (not shown) such as heaters or the like, are mounted to a base 30 of the press machine 28 and to the lower end of a piston rod 32 which is disposed above the base 30 and moves up and down. The upper die 16A is fixed to the upper heating plate 34 and the lower die 16B is fixed to the lower heating plate 34 by mounting hardware (not shown) respectively.

Note that, in the press machine 28, the moving speed of the piston rod 32 can be changed freely.

(Operation)

Next, the method of vulcanizing the donut-shaped torus 14 will be described.

The mold 16 is preheated, the donut-shaped torus 14 is placed in the annular concave portion 18B of the lower die 16B, the piston rod 32 is lowered, and the upper die 16A and the lower die 16B are fit tightly together (refer to FIG. 3B, and note that the donut-shaped torus 14 is not shown in FIG. 3B).

Thereafter, the donut-shaped torus 14 is heated for a predetermined period of time at a predetermined temperature set in advance, and is vulcanized.

When vulcanization is carried out, gas is generated within the rubber of the donut-shaped torus 14 due to the foaming agent, and the donut-shaped torus 14 swells within the space 18.

After the predetermined period of time has elapsed, the piston rod 32 is raised, and the mold 16 is opened.

When the mold 16 is opened, the air bubbles of gas within the rubber swell, and the rubber composition foams.

In the mold 16, the outer sides of the horizontal joining face 24A and the horizontal joining face 25A are the inclined joining face 24B and the inclined joining face 25B, and the outer sides of the horizontal joining face 26A and the horizontal joining face 27A are the inclined joining face 26B and the inclined joining face 27B. Thus, as shown in FIG. 6A, in the initial stage of opening, a gap $S_B$ between the inclined joining face portions remains extremely narrow with respect to a separation dimension $S_A$ between the upper die 16A and the lower die 16B. Further, the bulging portion of the foamed rubber composition is pressed by the inclined joining faces 24B, 25B of the upper die 16A, so that the foamed rubber composition does not suddenly bulge out directly into the atmosphere from the region between the horizontal mating surfaces.

Note that the pushing-out of the foamed rubber composition to the exterior of the mold is suppressed until the mold 16 is completely opened and the foamed rubber composition is removed therefrom (refer to FIGS. 6B and 6C).

As shown in FIG. 6D, when the mold 16 is completely opened and the donut-shaped torus 14 is removed from the mold 16, the donut-shaped torus 14 swells further, and becomes a form having a circular cross-section and no cracks.

Figure 7:
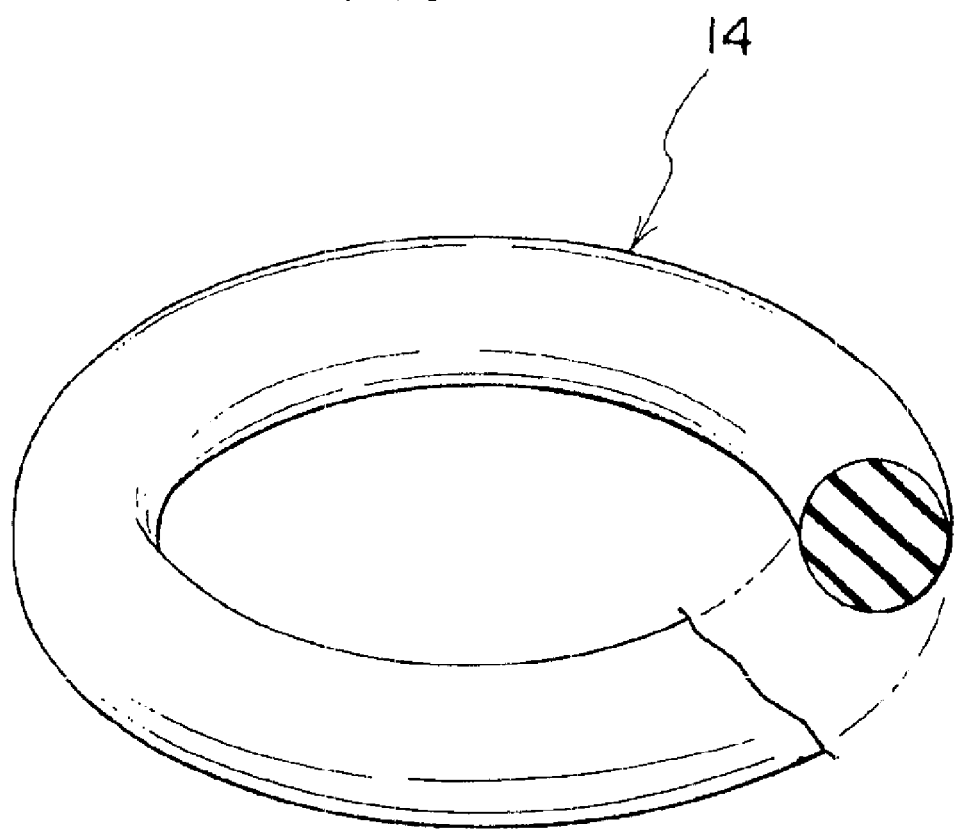
FIG. 7 is a perspective view of a foamed tube for a tire which is manufactured on the basis of the present invention.
Figure 8:
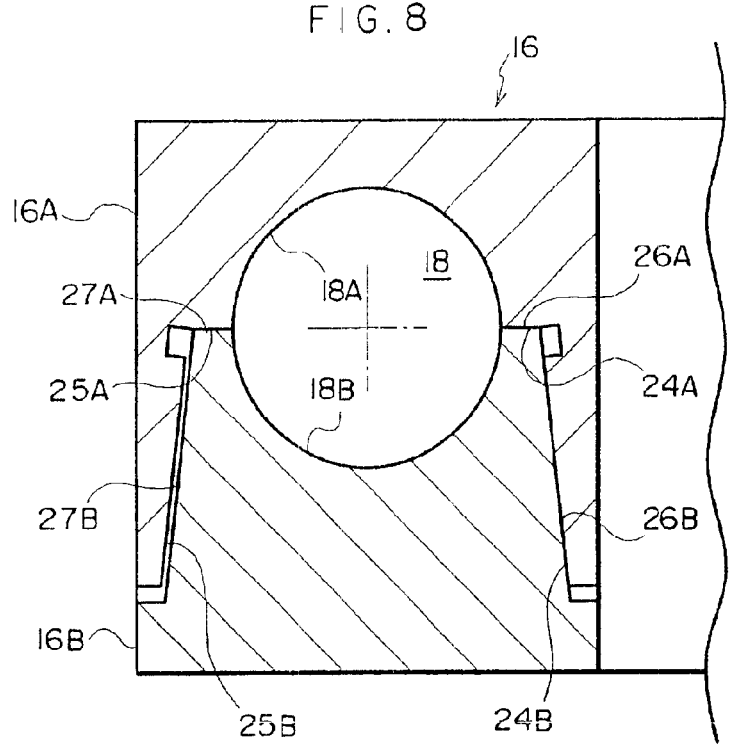
FIG. 8 is a partial, enlarged cross-sectional view of a mold relating to another embodiment.
Figure 9:
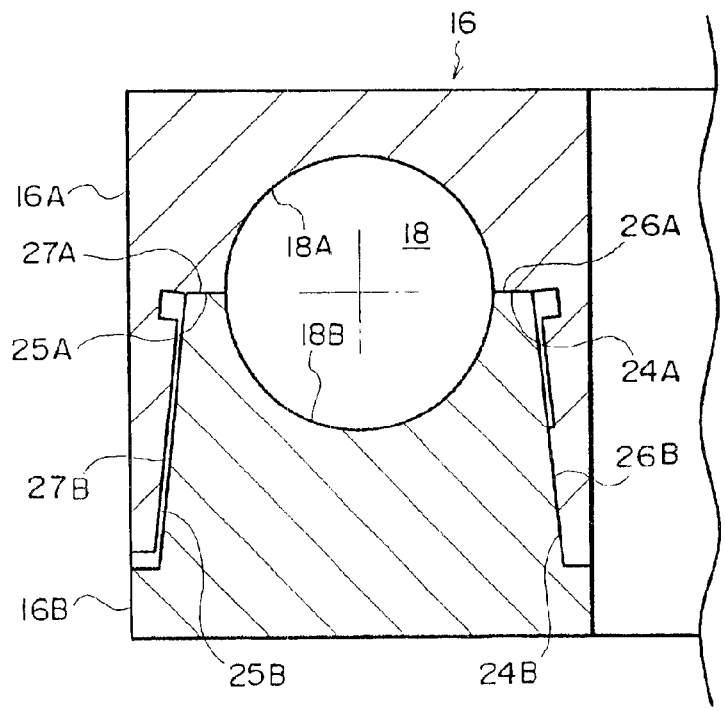
FIG. 9 is a partial, enlarged cross-sectional view of a mold relating to yet another embodiment.
Figure 10:
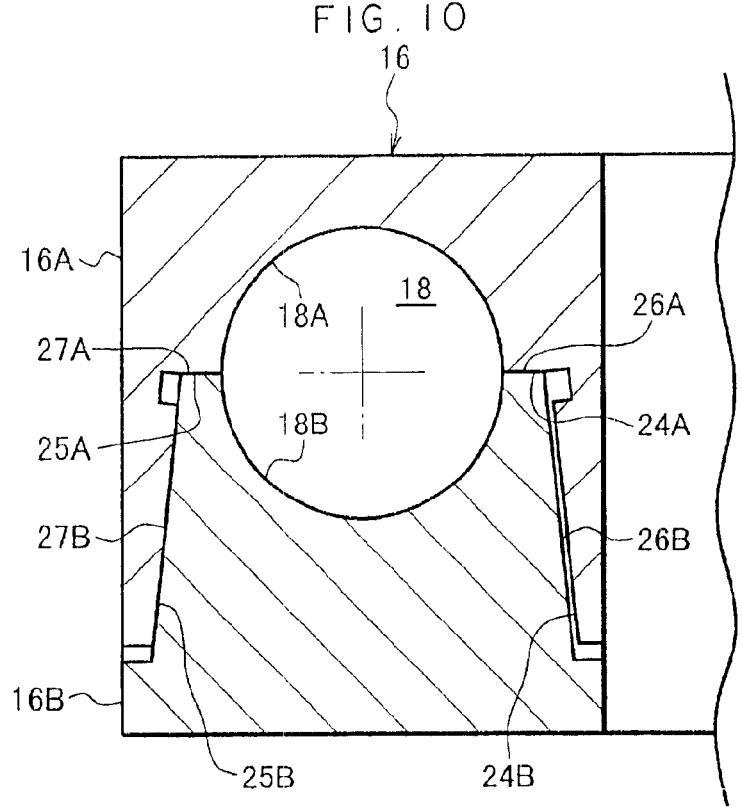
FIG. 10 is a partial, enlarged cross-sectional view of a mold relating to still another embodiment.
Figure 11:
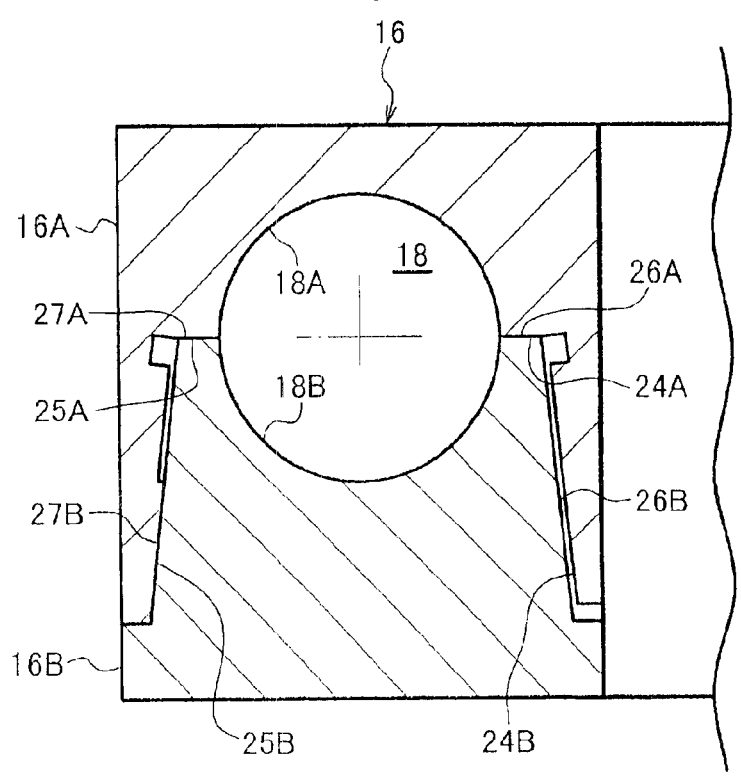
FIG. 11 is a partial, enlarged cross-sectional view of a mold relating to still yet another embodiment.

Thereafter, the donut-shaped torus 14 is left at room temperature until the foaming rate stabilizes, whereby the production of a foamed tube 44 for a tire which has absolutely no cracks, such as shown in FIG. 7, is completed.

(Experimental Example)

In order to confirm the effects of the present invention, vulcanization molding of a foamed tube for a tire was carried out in both a conventional mold and in the mold of the present invention.

Figure 12A:
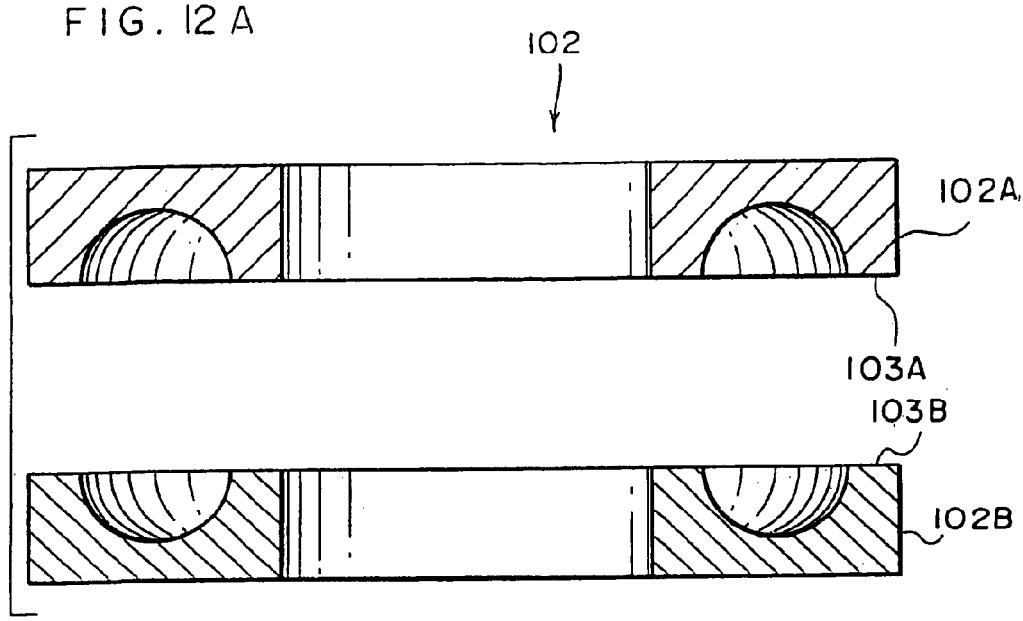
FIG. 12A is a cross-sectional view of a conventional mold in an open state.
Figure 12B:
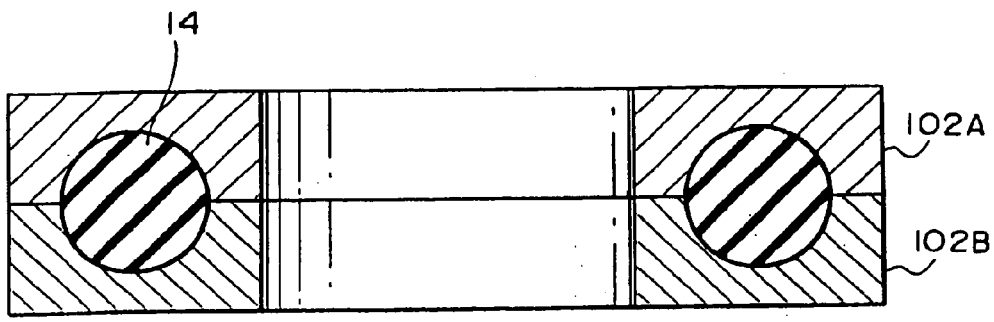
FIG. 12B is a cross-sectional view of the conventional mold in a closed state.
Figure 13:
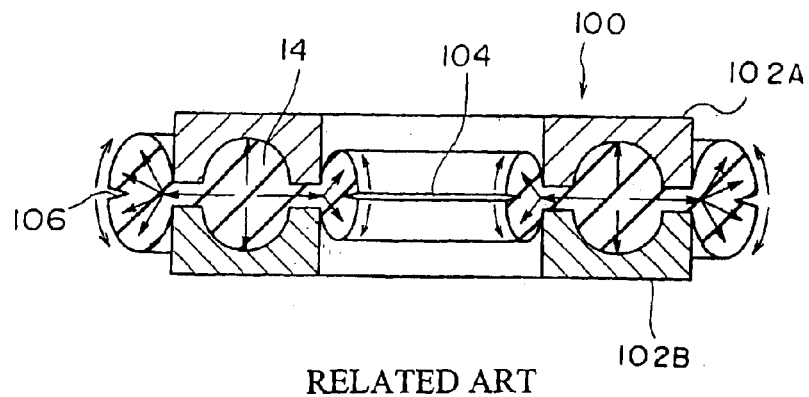
FIG. 13 is a cross-sectional view of the conventional mold in a state of being opened slightly.
Figure 14:
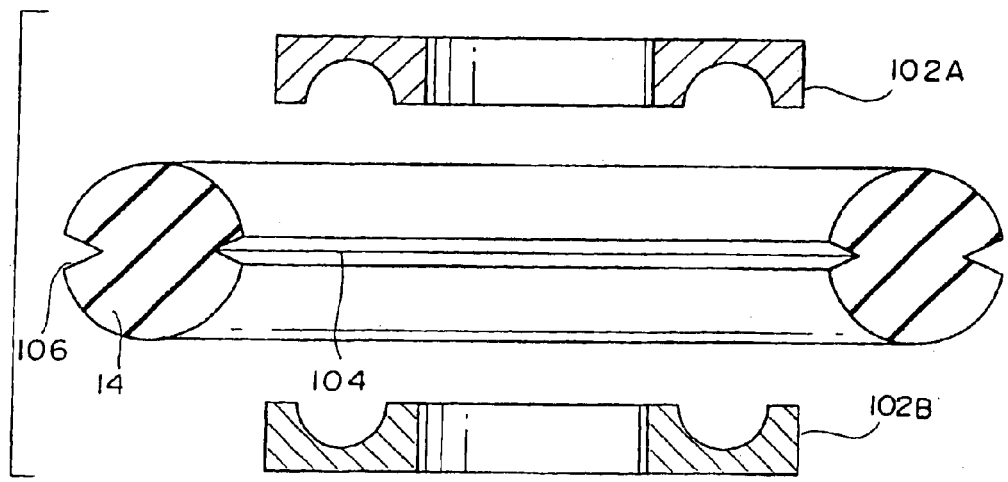
FIG. 14 is a cross-sectional view of the conventional mold, and a foamed tube for a tire which is manufactured by the mold and in which tears have arisen.

The conventional mold was the mold shown in FIG. 12. A radius R of the space was 40 mm, and the foaming rate was 800%. Generation of tears in the foamed tube for a tire when the mold was opened after vulcanization molding could not be prevented even at a high mold opening speed (200 mm/sec). However, in accordance with the mold 16 of the embodiment ($\alpha_1$, $\alpha_2$=95°, $W_1$, $W_2$=15 mm, $H_1$, $H_2$=50 mm), a foamed tube for a tire, whose external appearance of the surface was good and in which there were no tears even with a low opening speed (120 mm/sec), was obtained.

Further, in accordance with the mold 16 of the embodiment, when the opening speed of the mold 16 was 200 mm/sec, it was possible to increase the foaming rate to 1400%.

Note that, given that the volume before vulcanization is $V_0$ (cm$^3$) and the volume after vulcanization and swelling is $V_1$ (cm$^3$), the foaming rate $V_S$ is expressed as $V_S = V_1/V_0 \times 100 (\%)$.

(Other Embodiments)

In the mold 16 of the above-described embodiment, the inclined joining face 24B and the inclined joining face 26B are fit tightly together along the entire surfaces thereof, and the inclined joining face 25B and the inclined joining face 27B are fit tightly together along the entire surfaces thereof. However, the present invention is not limited to the same, and as shown in FIGS. 8 through 11, a gap 36 maybe formed at a portion between the inclined mating surfaces.

Further, the inclined mating surface 24B and the inclined mating surface 26B, or the inclined mating surface 25B and the inclined mating surface 27B, function as guides at the time of aligning the upper die 16A and the lower die 16B. However, if the horizontal surfaces are fit closely to one another and other portions have an aligning function, the narrow gap 36 maybe formed at all portions between the inclined joining face 24B and the inclined joining face 26B, and between the inclined joining face 25B and the inclined joining face 27B.

As described above, in accordance with the mold for molding a foamed tube for a tire and the method of manufacturing a foamed tube for a tire of the present invention, an excellent effect is achieved in that it is possible to manufacture a foamed tube for a tire which has no tears.

What is claimed is:

1. A mold for molding an annular foamed tube for a tire, comprising:
    a first mold having a first annular concave portion which molds one side, in an axial direction, of the foamed tube for a tire; and
    a second mold having a second annular concave portion which molds another side, in the axial direction, of the foamed tube for a tire,
    wherein when the first mold and the second mold are combined in the axial direction, the first annular concave portion and the second annular concave portion form an annular space for molding the foamed tube for a tire,
    the first mold has first joining faces which are connected to the first annular concave portion and which are positioned at an inner side and an outer side, in a radial direction, of the first annular concave portion, and the first joining faces include horizontal joining faces provided adjacent to the first annular concave portion in a direction orthogonal to the axial direction at the inner side and the outer side, in the radial direction, of the first annular concave portion, and inclined joining faces each provided continuously with a respective one of the horizontal joining faces so as to be inclined with respect to the horizontal joining face at one of an inner side and an outer side in the radial direction,
    the second mold has second joining faces which are connected to the second annular concave portion and which are positioned at an inner side and an outer side, in the radial direction, of the second annular concave portion, and the second joining faces include horizontal joining faces provided adjacent to the second annular concave portion in a direction orthogonal to the axial direction at the inner side and the outer side, in the radial direction, of the second annular concave portion, and inclined joining faces each provided continuously with a respective one of the horizontal joining faces so as to be inclined with respect to the horizontal joining face at one of an inner side and an outer side in the radial direction, and
    the first mold and the second mold have configurations which complementarily complete one another via the first joining faces and the second joining faces.

2. A mold for molding a foamed tube for a tire according to claim 1, wherein, of the inclined joining faces of the first joining faces and the inclined joining faces of the second joining faces, at least the inclined joining faces which are positioned at the outer side in the radial direction form an angle of 90 to 120° with respect to the horizontal joining face adjacent thereto.

3. A mold for molding a foamed tube for a tire according to claim 1, wherein a cross-sectional configuration, along the axial direction, of the annular space is circular, and given that a radius of the annular space is R and a length, in the axial direction, of the inclined joining face is H, a relation R≦H≦3R is satisfied.

4. A mold for molding a foamed tube for a tire according to claim 1, wherein a width, in the radial direction, of each horizontal joining face of the first and second joining faces is in a range of 5 to 30 mm.

5. A mold for molding a foamed tube for a tire according to claim 1, wherein when the first mold and the second mold are combined, the horizontal joining faces of the first joining faces and the horizontal joining faces of the second joining faces fit tightly together.

6. A mold for molding a foamed tube for a tire according to claim 5, wherein the first mold and the second mold are aligned by engaging the inclined joining faces of the first joining faces and the inclined joining faces of the second joining faces.

7. A mold for molding a foamed tube for a tire according to claim 6, wherein when the first mold and the second mold are combined, the inclined joining faces of the first joining faces and the corresponding inclined joining faces of the second joining faces are fit tightly together at at least one portion at at least one of the inner side and the outer side in the radial direction.

8. A mold for molding a foamed tube for a tire according to claim 7, wherein when the first mold and the second mold are combined, a gap is formed between the inclined joining faces of the first joining faces and the corresponding inclined joining faces of the second joining faces, along the entire circumference of the molds.

9. A mold for molding a foamed tube for a tire according to claim 6, wherein when the first mold and the second mold are combined, the inclined joining faces of the first joining faces and the corresponding inclined joining faces of the second joining faces are in a close contact with each other, along an entire range thereof.

10. A mold for molding an annular foamed tube for a tire, comprising:
    a first mold having a first annular concave portion which molds one side, in an axial direction, of the foamed tube for a tire; and
    a second mold having a second annular concave portion which molds another side, in the axial direction, of the foamed tube for a tire,
    wherein when the first mold and the second mold are combined in the axial direction, the first annular concave portion and the second annular concave portion form an annular space for molding the foamed tube for a tire,
    the first mold includes horizontal joining faces provided adjacent to the first annular concave portion in a direction orthogonal to the axial direction at an inner side and an outer side, in a radial direction, of the first annular concave portion, and inclined joining faces each provided continuously with a respective one of the horizontal joining faces so as to be inclined with respect to the horizontal joining face at one of an inner side and an outer side in the radial direction, the second mold includes horizontal joining faces provided adjacent to the second annular concave portion in a direction orthogonal to the axial direction at an inner side and an outer side, in the radial direction, of the second annular concave portion, and inclined joining faces each provided continuously with a respective one of the horizontal joining faces so as to be inclined with respect to the horizontal joining face at one of an inner side and an outer side in the radial direction, and a sum of an angle, which the horizontal joining face of the first mold forms with the inclined joining face adjacent thereto, and an angle, which the horizontal joining face of the second mold forms with the inclined joining face adjacent thereto, is substantially 360°.

11. A mold for forming a foamed tube for a tire according to claim 10, wherein, of the two angles, a smaller angle is within a range of 90° to 120°.

12. A mold for molding a foamed tube for a tire according to claim 10, wherein a cross-sectional configuration, along the axial direction, of the annular space is circular, and given that a radius of the annular space is R and a length, in the axial direction, of the inclined joining face is H, a relation $R \leq H \leq 3R$ is satisfied.

13. A mold for molding a foamed tube for a tire according to claim 10, wherein a width, in the radial direction, of each horizontal joining face is in a range of 5 to 30 mm.

14. A mold for molding a foamed tube for a tire according to claim 10, wherein when the first mold and the second mold are combined, the horizontal joining faces of the first mold and the horizontal joining faces of the second mold fit tightly together.

* * * * *